(No Model.) 3 Sheets—Sheet 1.

T. TERRELL.
BOTTLE STOPPER.

No. 387,379. Patented Aug. 7, 1888.

Witnesses.
John G. Tongue.
Henry Birkbeck.

Inventor:
Thos. Terrell.

N. PETERS, Photo-Lithographer, Washington, D. C.

(No Model.) 3 Sheets—Sheet 2.
T. TERRELL.
BOTTLE STOPPER.
No. 387,379. Patented Aug. 7, 1888.
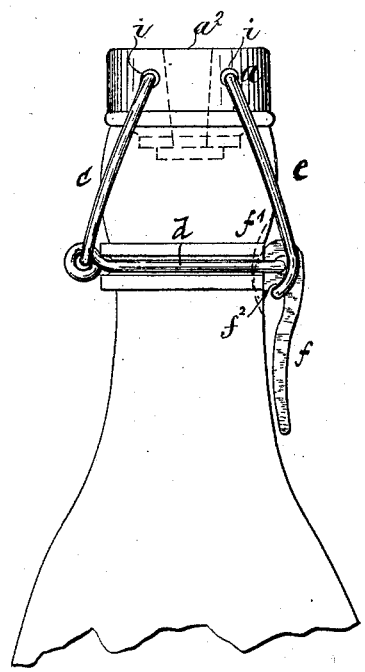
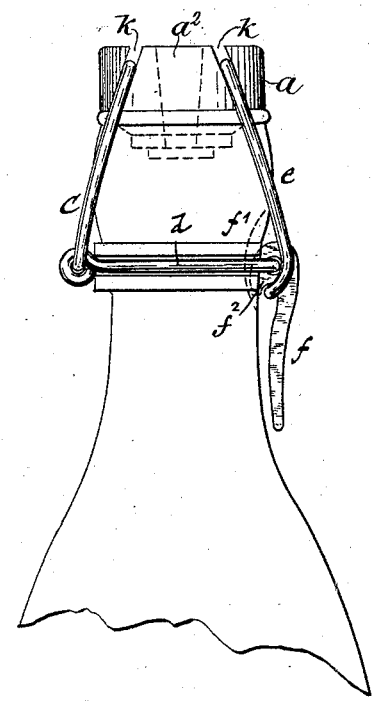
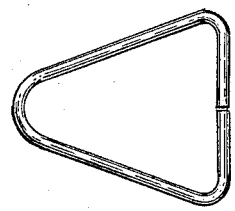
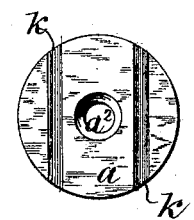
Witnesses.
John G. Tongue.
Henry Birkbeck.
Inventor.
Thos. Terrell.

(No Model.) 3 Sheets—Sheet 3.
T. TERRELL.
BOTTLE STOPPER.
No. 387,379. Patented Aug. 7, 1888.
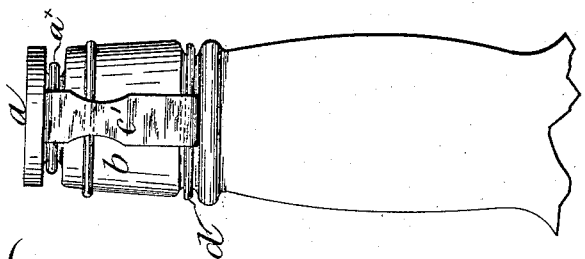
Fig. 13.
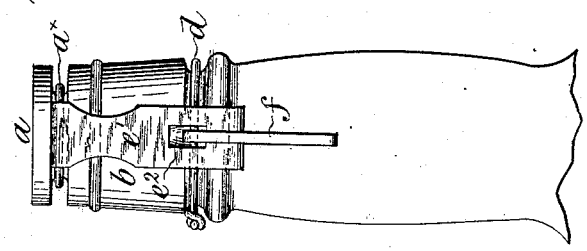 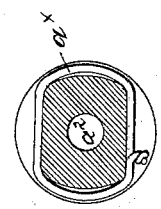
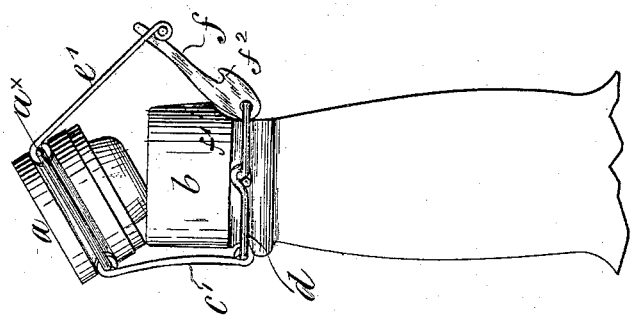 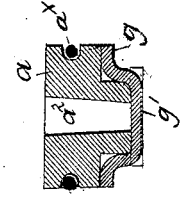
Fig. 12. Fig. 14.
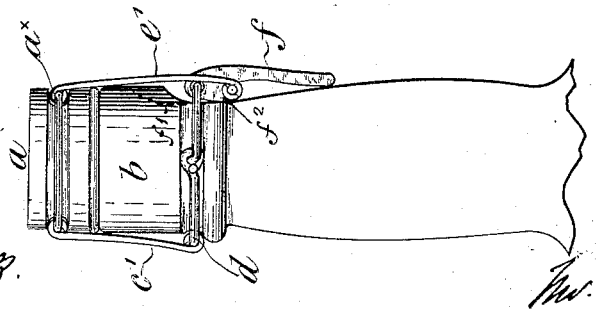
Fig. 11.
Witnesses.
John G. Tongue.
Henry Birkbeck.
Inventor.
Thos. Terrell.

UNITED STATES PATENT OFFICE.

THOMAS TERRELL, OF NEW COURT TEMPLE, COUNTY OF MIDDLESEX, ENGLAND.

BOTTLE-STOPPER.

SPECIFICATION forming part of Letters Patent No. 387,379, dated August 7, 1888.

Application filed October 28, 1887. Serial No. 253,657. (No model.)

*To all whom it may concern:*

Be it known that I, THOMAS TERRELL, a subject of the Queen of Great Britain, residing at No. 1 New Court Temple, in the county of Middlesex, England, barrister at law, have invented certain new and useful Improvements in Stoppering Bottles for Aerated and other Liquids, of which the following is a specification.

This invention relates to improvements in stoppering bottles for containing soda-water or other aerated liquids, malt liquor, or other liquids, the stopper when removed to discharge the contents being retained by a metal loop, connecting-piece, or plate, which connects it to the neck of the bottle ready for use again.

Figure 1:
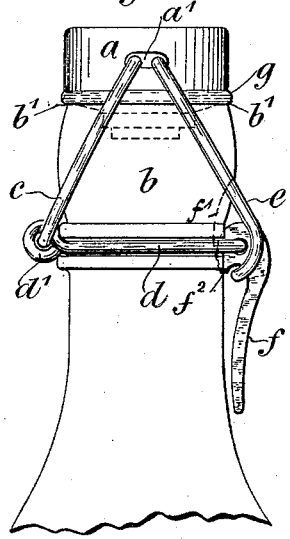
Figure 3:
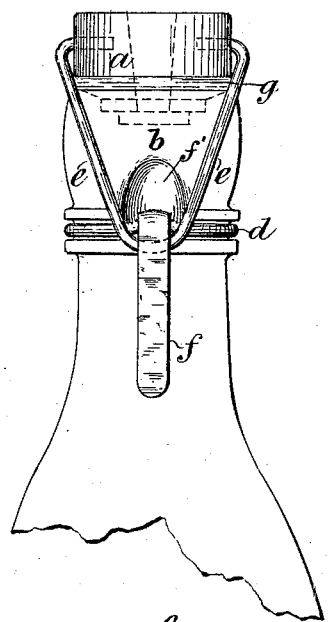
Figure 4:
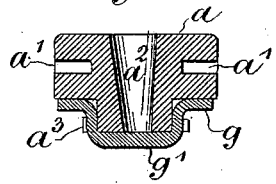
Figure 5:
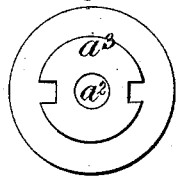
Figure 6:
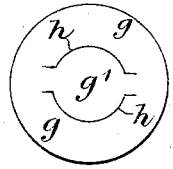
Figure 2:
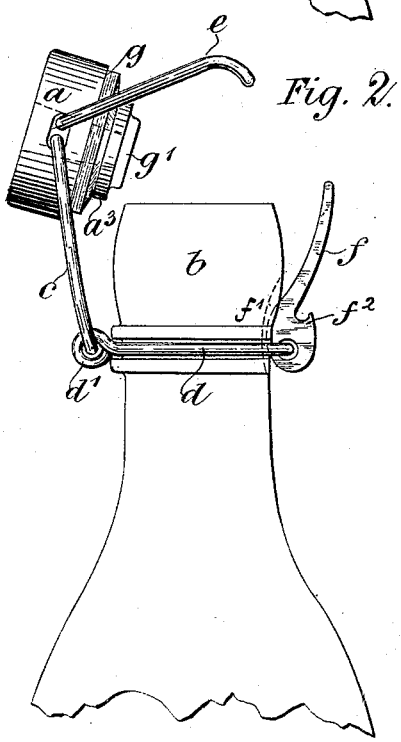

Figure 1 shows an exterior view in elevation of an aerated-water bottle of the ordinary character having my improvements applied thereto, the stopper being closed down. Fig. 2 shows the mouth of the bottle open, and Fig. 3 another view of the mouth of the bottle with stopper closed down, the arrangement of the latter being shown in dotted lines. Figs. 4, 5, and 6 show detail views of the stopper and valve. Figs. 7 and 8 show modifications of the arrangement of mounting the metal loops on the stopper, and Figs. 9 and 10 are detail views of parts of such modifications, and Figs. 11 to 13 show another method of carrying out my invention.

Referring to Figs. 1 to 6, the stopper $a$ (which may be made of china, glass, or other suitable materials) fits into the mouth of the bottle $b$, on which it is mounted and permanently secured by the metal loop $c$, which is connected to the bottle by the eye or loop $d'$, formed in the ring or metal collar $d$, fixed in a groove formed around the neck of the bottle. A second metal loop, $e$, is mounted on the stopper $a$, and when the stopper has been placed in position in the mouth of the bottle is passed over the lever-arm $f$, threaded or mounted on the collar $d$, and provided on its inner face near its upper end with a hook, $f^2$, on the opposite side to the eye $d'$. The lever-arm $f$ is then pulled over against the bottle-neck, and thus tightly draws down the loop $e$ and secures the stopper firmly onto its seating $b'$ on the mouth of the bottle $b$. The stopper $a$ has holes $a'$ formed therein to receive the turned-in ends of the loops $c$ and $e$, and these latter are sprung into the holes $a'$, which are advantageously of an oval or elongated shape.

For some purposes (as previously described) a passage, $a^2$, is formed through the stopper $a$, on the under side of which is mounted a washer and valve, (made of any suitable material,) in this case made all in one piece, $g\ g'$, of vulcanized india-rubber, the two thorough cuts, $h\ h$, Fig. 6, allowing the part $g$ to pass over the collar or neck $a^3$, formed on the body of the stopper $a$, and so to form a washer to make the stopper-seating air and fluid tight, while the center part, $g'$, Fig. 6, is stretched across the bottom of the stopper over the passage $a^2$, and so forms an inlet-valve.

Figs. 7 to 10 show two modifications of the arrangement and mountings of the metal loops, which in both modifications may be formed as shown in Fig. 9, with their ends abutting, in one case the holes $i\ i$, Fig. 7, being formed right through the stopper $a$, or, in place thereof, channels $k\ k$ may be formed in the top of the stopper $a$, as shown in Figs. 8 and 10, the latter figure being a plan of the stopper $a$ with channels $k\ k$, which are formed clear of the passage $a^2$ in the stopper $a$.

In order to keep the parts as compact as possible, a recess or channel, $f'$, is formed or cut in the neck of the bottle immediately under the lever $f$, (where it is threaded or mounted on the collar $d$,) as shown by the dotted lines in Figs. 1, 2, 7, and 8.

Figs. 11 to 14 show another method of carrying out my invention. In place of the metal loops $c$ and $e$, previously described, I use corresponding plates of metal, (advantageously formed of mild steel,) the back plate or hinge piece $c'$ being mounted at one end on the collar $d$, arranged on the neck of the bottle, and at its other end on the collar $a^\times$, arranged in a groove formed around the upper part of the stopper $a$, which is thus permanently connected to the bottle $b$, and is formed either with or without an inlet-valve, (as previously described,) according to the purposes for which it is required. The plate $e'$ is mounted on the collar $a^\times$ on the opposite side of the stopper to that on which the hinge-piece $c'$ is mounted, (front and back views of a bottle having these improvements applied being shown in Figs.

13,) the plate $e'$ having a hole or slot, $e^2$, formed therein, and through this slot is threaded the lever-arm $f$, which is then pulled over and draws down and retains the stopper tightly onto its seating.

Fig. 14 shows details of the construction of the stopper $a$ and groove or channel formed therein for the collar $a^\times$, care being had to mount the metal plates $c'$ and $e'$ in such a manner that when the stopper is closed down they lay close up against it, as shown in Fig. 11.

In every case the lever-arm should be so mounted that when it is pulled over and the stopper closed down the hook $f^2$ will be on the inside of the lever-arm, so that the pull or pressure of the loop or slotted plate will be inside of the bearing of the lever-arm, so that the lever-arm $f$ will be held down by the pull or pressure and not have any tendency to open.

Having thus described my invention, I claim as new and desire to secure by Letters Patent—

The combination of a bottle-neck having a recess or channel at one side thereof, a collar surrounding the neck, a stopper, a connecting-link hinged to said stopper and collar at its opposite ends, a loop hinged at its upper end to said stopper at a point opposite the hinge of the link, and a lever-arm hinged at one end to said collar and adapted to swing in said recess and engage said loop, said lever having a hook on its inner face when in its normal closed position, substantially as described.

THOMAS TERRELL.

Witnesses:
 HENRY BIRHBULZ,
 WALTER J. SKERTEN.